United States Patent [19]

Goupillaud

[11] 3,774,146

[45] Nov. 20, 1973

[54] METHOD AND APPARATUS FOR ELECTRIC SIGNAL PATTERN DISCRIMINATION

[75] Inventor: Pierre L. Goupillaud, Ponca City, Okla.

[73] Assignee: Continental Oil Company, Ponca City, Okla.

[22] Filed: Mar. 23, 1972

[21] Appl. No.: 237,298

Related U.S. Application Data

[63] Continuation-in-part of Ser. No. 848,777, Aug. 11, 1969, Pat. No. 3,652,980.

[52] U.S. Cl. 340/15.5 SC, 340/15.5 CC, 340/15.5 FC

[51] Int. Cl. ................................................ G01v 1/30

[58] Field of Search ...................... 340/15.5 FC, 1 F, 340/1 CC, 1 SC

[56] References Cited

UNITED STATES PATENTS

| | | | |
|---|---|---|---|
| 3,311,874 | 3/1967 | Sheffield | 340/15.5 FC |
| 3,437,999 | 4/1969 | Lanorum | 340/15.5 SC |

*Primary Examiner*—Benjamin A. Borchelt
*Assistant Examiner*—N. Moskowitz
*Attorney*—Joseph C. Kotarski et al.

[57] ABSTRACT

A method for extracting predetermined types of electrical signal data from an overall composite of time analog signal input information, the method consisting of constructing an ideal filter for each of selected electrical signal components of an input signal group, such filter construction being carried out by determining the pseudo-inverse or generalized inverse of a polynomial matrix as determined for the particular input signals to be examined, with application of the polynomial matrix for preadjustment of a multichannel pattern discriminating filter which, when energized by the input signals under examination, will produce separately the requisite selected electrical signal component outputs. Apparatus for carrying out the method may consist of plural channels of time domain filters connected in series with a weighting device for convolving input electrical signals; each of the convolution filters is adjusted to function at predetermined times and amplitudes in accordance with the matrix function or operator determined for selected signal component functions of a particular set of input electrical signals.

4 Claims, 9 Drawing Figures

PATENTED NOV 20 1973

3,774,146

SHEET 1 OF 6

PATENTED NOV 20 1973 3,774,146

SHEET 3 OF 6

METHOD AND APPARATUS FOR ELECTRIC SIGNAL PATTERN DISCRIMINATION

CROSS REFERENCE TO RELATED APPLICATION

The present invention is a continuation-in-part of a co-pending U.S. Patent Application Ser. No. 848,777, now U.S. Pat. No. 3,652,980, entitled "Method and Apparatus for Seismic Signal Pattern Discrimination," as filed on Aug. 11, 1969 in the name of Goupillaud.

BACKGROUND OF THE INVENTION

1. Field of the Invention

The invention related generally to electrical signal processing systems and, more particularly, but not by way of limitation, it relates to improved electrical signal processing apparatus which is capable of extracting predetermined forms of signal information from an overall signal input group.

2. Description of the Prior Art

The prior art includes various types of signal processing systems which perform various modes and combinations of filtration procedure such as frequency responsive filtering, correlation filtering, etc. Many attempts have been made at construction of an ideal filter for receiving a given set of input electrical signal values therethrough in the expectation that the ideally filtered trace signal might possibly be existent at the output. However, the prior filtration teachings, as well as the practical applications, have depended upon various methods of attenuating unwanted signals through one or more limiting operations, this also resulting in degradation and loss of valuable signal information at the same time. A successful approach at actual extraction of desired electrical information from a series or train of input signals has been elusive but the present invention sets forth a method for effectively separating out desired information and completely eliminating unwanted signal values.

SUMMARY OF THE INVENTION

The present invention contemplates method and apparatus for processing of electrical signals wherein sample data is employed to construct a multi-channel pattern discriminating filter which reduces signal input data to the respective contributing factors of frequency variant and noise components. In a more limited aspect, the invention consists of applying one or more input signal traces to a respective time domain filter having its weights adjusted in accordance with an operator determined by a pseudoinverse matrix function. The outputs of respective time domain filters are then summed to form a distorted representation of respective frequency variant and noise components of the input signals, whereupon further recursive filtering in accordance with a spiking operator will provide desired output information.

Therefore, it is an object of the present invention to provide a signal processing system which approaches ideal signal filtration through extraction of desired signal information.

It is also an object of the invention to provide an apparatus for extraction of a specific type of seismic signal return from extremely scrambled and masked over signals.

It is a further object of the invention to provide a method and apparatus capable of unscrambling an input signal and extracting and separating one or more signal components from an input signal or signal group.

Finally, it is an object of the present invention to provide method and apparatus for extracting predetermined signal information from a plural signal group with no degradation or loss of the specific signal information sought.

Other objects and advantages of the invention will be evident from the following detailed description when read in conjunction with the accompanying drawings which illustrate the invention.

DETAILED DESCRIPTION OF THE PREFERRED EMBODIMENT

Figure 1B:
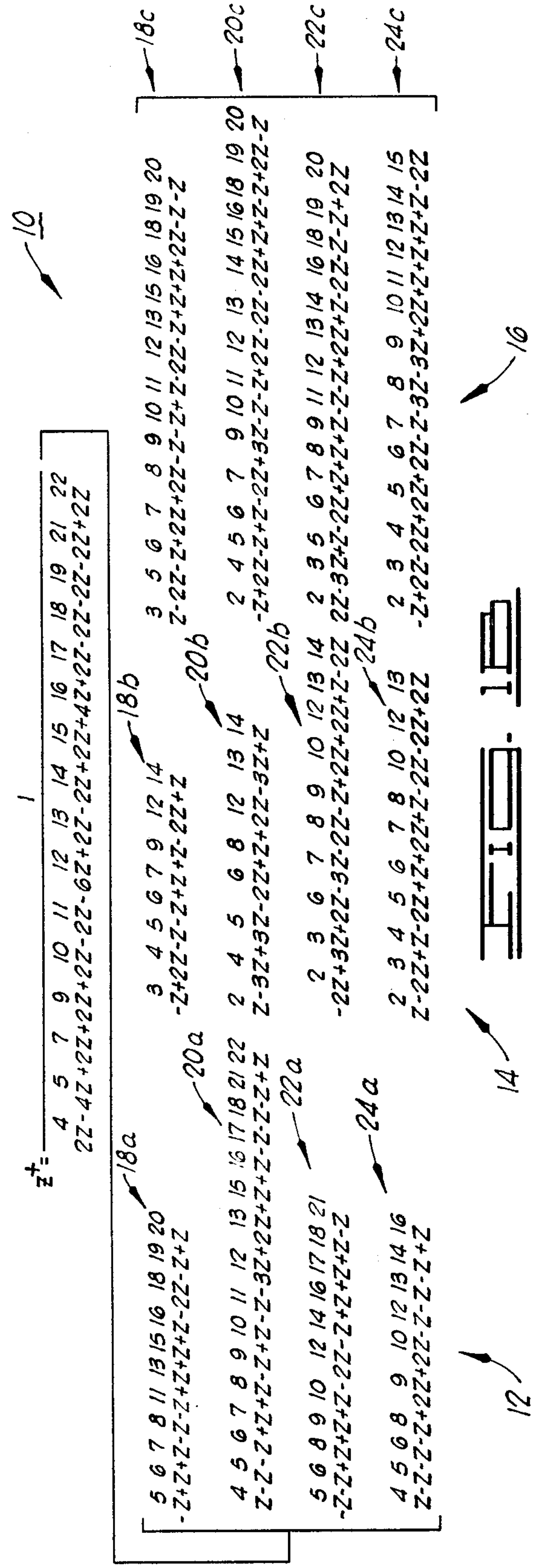
FIG. 1B is an algebraic matrix representing a pseudoinverse entity as constructed for operation in the invention.

The present system is directed to a method and apparatus which is capable of unscrambling received electrical signal information in order that a more meaningful interpretation can be isolated or indicated. Such procedure may be likened to unscrambling techniques as employed in communications and facsimile technologies wherein electrical signal scrambling may be the result of predetermined coding schemes, such intentional scrambling being capable of reversal with designated unscrambling equipment for reconstitution to its original form. However, in some cases, e.g., seismic information, the scrambling is due to natural causes which tend to defy analysis into the various sub-components of the overall signal indications. In still other cases, a discrimination of selected ones of sub-components of electrical signal energy may rely upon analysis in terms of probability of occurrence of the particular components.

The present invention contemplates a solution to the problem by means of a scheme which is best defined in mathematical terms. Thus, a plurality of electrical input signals may comprise common components which are shifted by varying amounts. Such common components will take the form of one or more of signal energies known as frequency variant or interference components. Any component susceptible of separation and identification may be utilized in carrying out the invention.

Thus, for example, a first signal may comprise a selected one each of three components as, $$S_1(t) = a(t) + b(t) + c(t) \quad (1)$$

where $a(t)$ represents a first signal component, $b(t)$ is a second signal component, and $c(t)$ is a third signal component. Remaining ones of a signal group, e.g., a four signal input data group, might be represented as $$S_2(t) = a(t) + b(t - t_{22}) + c(t - t_{23})$$
$$S_3(t) = a(t) + b(t - t_{32}) + c(t - t_{33}) \quad (2)$$
$$S_4(t) = a(t) + b(t - t_{42}) + c(t - t_{43})$$

where, as may be seen, various components are shifted in time by known amounts $t_{ij}$, where i is an index for the signal and $j$ an index for the time/analog component.

As is well known in the art of sampled data analysis, by means of the z-transformation, equation (1) may be represented as the series $$S_1(z) = S_1(0) + S_1(1\Delta t)z^1 + S_1(2\Delta t)z^2 + \ldots \quad (3)$$

whereupon the polynomial representation for the entire four trace group becomes a row vector of polynomials $$S_{1\times4} = ]S_1(z), S_2(z), S_3(z), S_4(z)] \quad (4)$$

and equation (4) may be further designated or rewritten as $$S_{1\times4}=[a(z), b(z), c(z)]_{1\times3} \begin{bmatrix} 1 & 1 & 1 & 1 \\ 1 & z^{t22} & z^{t23} & z^{t24} \\ 1 & z^{t32} & z^{t33} & z^{t34} \end{bmatrix}_{3\times4} = C_{1\times3}Z_{3\times4} \quad (5)$$

wherein $C$ is a row vector comprising the three polynomials representing the three components. The purpose of the ideal filter is to rectrieve $C_{1\times3}$ from $S_{1\times4}$.

The matrix $Z_{3\times4}$ is called the pattern matrix. An example of such a matrix is presented in expanded form in FIG. 1A. Thus, given that $$S_{1\times4} = C_{1\times3}\, Z_{3\times4} \quad (6)$$

then it may be postulated that there exists a matrix $Z^+_{4\times3}$ such that $$S_{1\times4}\, Z^+_{4\times3} = C_{1\times3}\, Z_{3\times4}\, Z^+_{4\times3} = C_{1\times3}\, I_{3\times3} = C_{1\times3} \quad (7)$$

This is true if $$Z_{3\times4}\, Z^+_{4\times3} = I_{3\times3} \quad (8)$$

But, clearly, if $Z^+ = Z^T\,(ZZ^T)^{-1}$ then, $$Z_{3\times4}\, Z^T_{4\times4}\,(Z_{3\times4}\, Z^T_{4\times3})^{-1}_{3\times3} = I_{3\times3} = ZZ^+ \quad (9)$$

where $Z^T$, represents $Z$ transpose, a well-known matrix operation.

It will then follow that we must define $$Z^+ \triangleq Z^T(ZZ^T)^{-1} \quad (10)$$

and this is always true because of the existence of the regular inverse of a symmetric matrix. The resulting polynomial representation, as shown in equation (10), is what may be referred to as a generalized inverse or pseudoinverse of a rectangular matrix. The matrix of the pseudoinverse representation of $Z^+$ is represented in its fully expanded form in FIG. 1B.

Since the elements of the matrix are polynomials, the elements of the pseudoinverse will be ratios of polynomials as shown in FIG. 1B. The polynomial denominator 10 of all the pseudoinverse elements will be the same the determinant of the matrix $(ZZ^T)$. The value $Z^+$ is indivative of the operation which must be performed on selected signal inputs $S_1(t) - S_4(t)$. Each column 12, 14 and 16 of the pseudo-inverse matrix $Z^+$ characterizes a series of operators, one operator for each of the input signal traces.

As is well known in sampled data systems, the $Z$ transform of an input signal trace $S_1(t)$ has been defined above by equating it to the series $$S_1(z) = S_1 + S_1\,(\Delta t)Z + S_1\,(2\Delta t)Z^2 + \ldots\ldots\ \text{etc.} \quad (11)$$

This transformation indicates that the $Z$ variable is a shifting operator; that is, multiplying a polynomial corresponding to a signal by $Z^n$ corresponds to shifting the signal by n times the sampling interval. Thus, the individual rows of respective columns 12, 14 and 16 of the matrix $Z^+$ each represent a time domain operator within the filtering scheme which will be peculiar to a selected set of input signal values.

Figure 2:
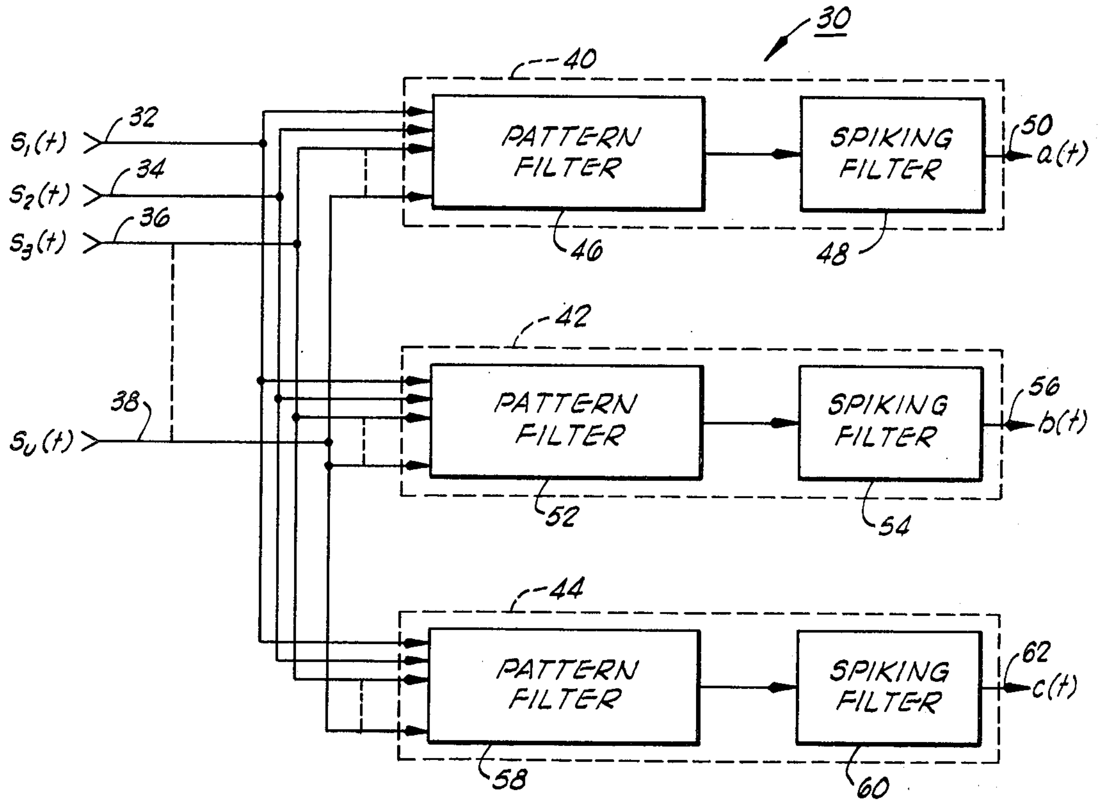
FIG. 2 is a block diagram of a multi-signal processing system constructed in accordance with the invention.
Figure 3A:
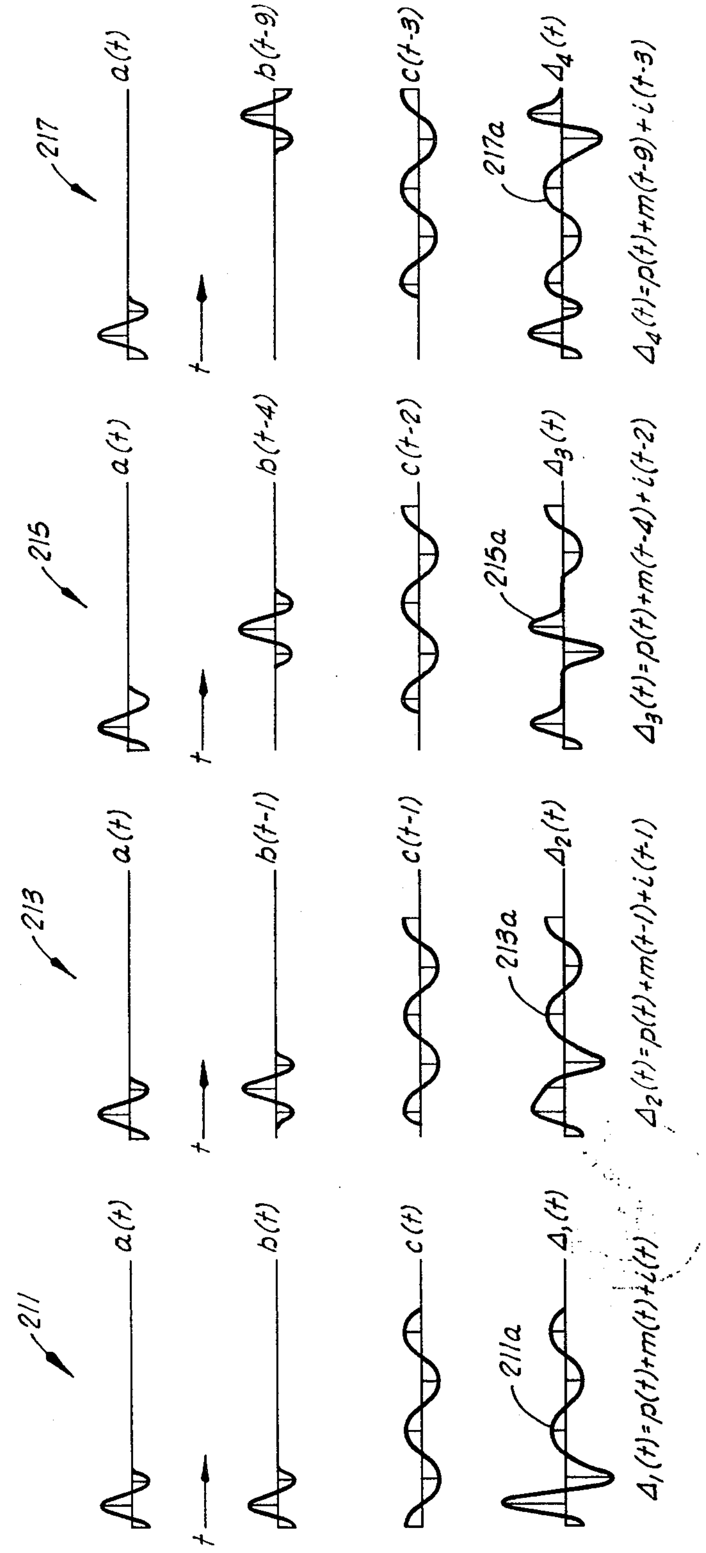
FIG. 3A is a derivation of time/analog signal values to be used in accordance with the present invention.
Figure 3B:
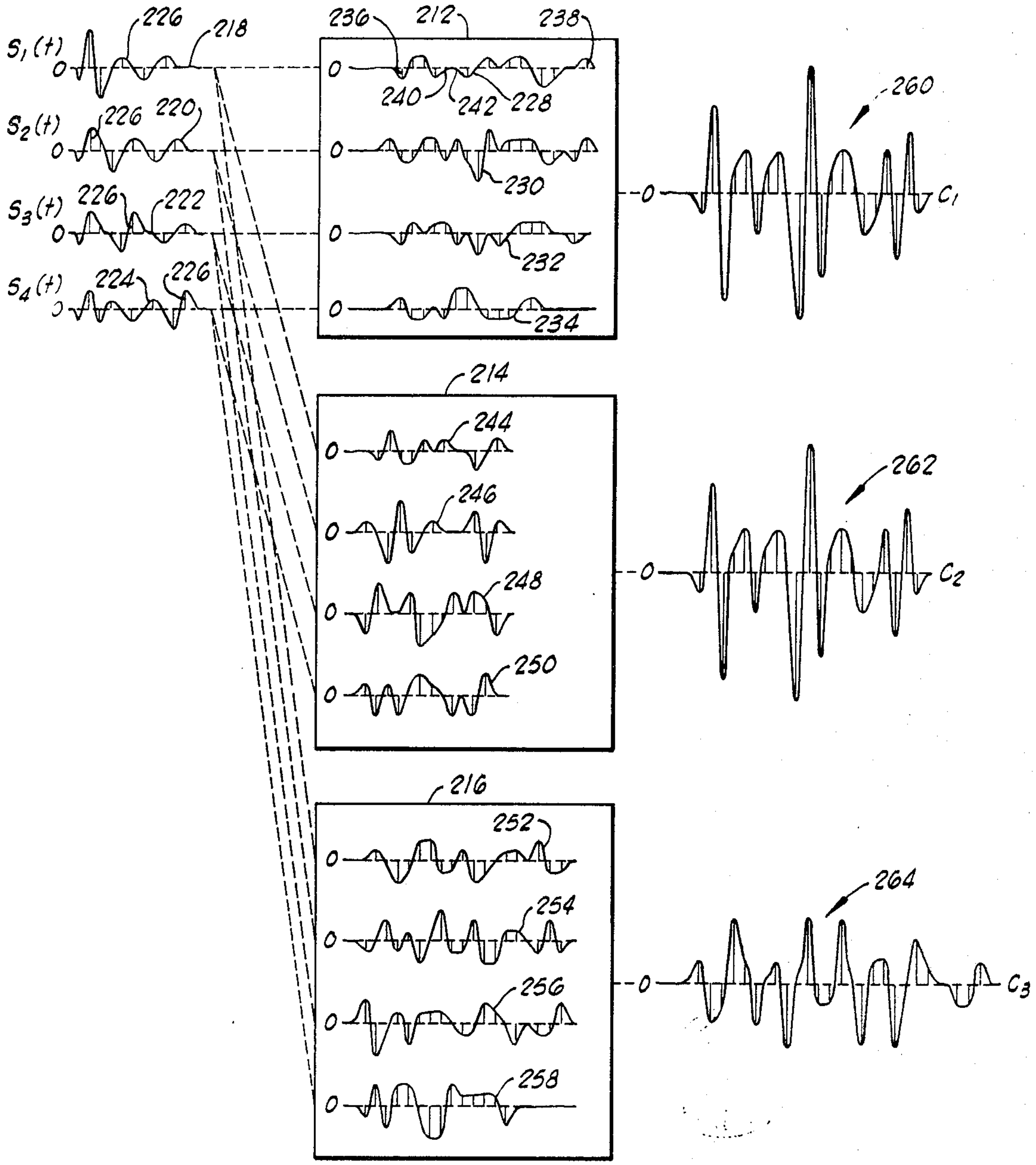
FIG. 3B is a functional diagram illustrating the operations performed upon the signal values of FIG. 3A, in accordance with the matrix of FIG. 1B.

The block diagram of FIG. 2 illustrates the various sub-components of one form of system for processing multiple signal inputs to derive specific information as to selected ones of frequency variant or interference signal component indications, three components being shown for illustration purposes. Thus, the signal processing system 30 receives input signal at input leads 32, 34, 36 and 38. Input leads 32–38 receive respective ones of a multiple of signals, in this case four signals, but the number of inputs will vary with exigencies, which are then applied in parallel to each of respective first component processing channel 40, second component processing channel 42 and third component processing channel 44. First component processing channel 40 includes a pattern filter 46 which provides a summed output to a spiking or recursive filter 48 with output of first signal component indications at output 50. Similarly, the second processing channel 42 receives plural signal inputs at a pattern filter 52 which provides a summed output to a spiking filter 54 with resulting second component indications at output 56, while third component convolution takes place in a pattern filter 58 with output through spiking filter 60 to an indication output 62. Actual disposition of related operation functions is illustrated in FIGS. 3A and 3B as will be further described below.

The pattern filters 46, 52 and 58 may be any of various well-known time domain filtering equipments and the spiking filters 48, 54 and 60 may also be conventional hardware finding general availability in the electrical signal processing art. The pattern filters 46, 52 and 58 for a four signal input are shown with greater particularity in FIG. 4. Each of the pattern filters 46, 52 and 58 consists of a plurality of individual time delays which provide plural outputs to a respective weighting network.

Thus, pattern filter 46 is comprised of plural time delay units, in this case four such time delays 64, 66, 68 and 70 connected in parallel relationship, and each providing plural channel outputs 72, 74, 76 and 78 to the respective weighting networks 80, 82, 84 and 86. The output from weighting networks 80, 82, 84 and 86 are individually summed for output via leads 88, 90, 92 and 94 for further summation in a summation network 96 for output on a line 98 as the $C_1$ data value. The $C_1$ value exists in convolution with an operator value representative of a time analog function indicative of predetermined component electrical signals within the $S_1(t) - S_4(t)$ trace information.

Figure 5:
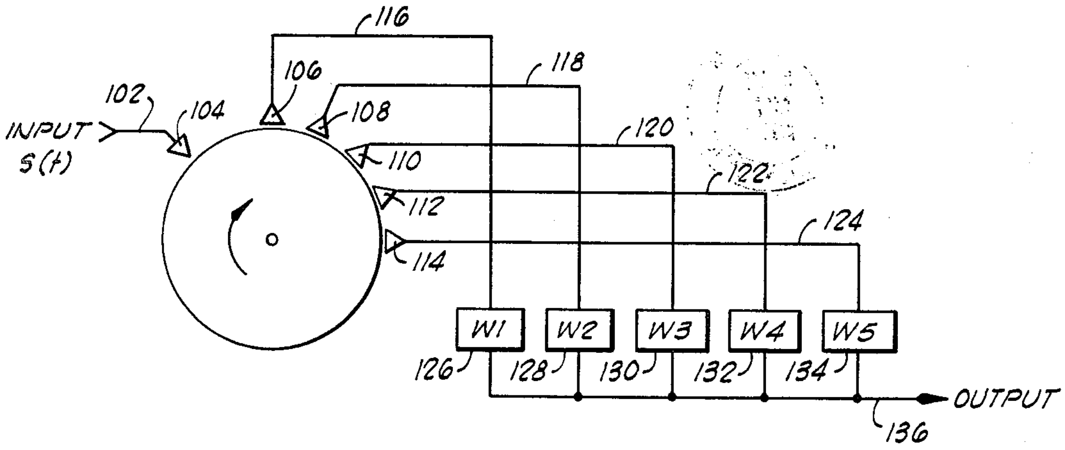
FIG. 5 is a block diagram of one form of a time domain filter which may be employed in the system of FIG. 4.

One form of time delay unit and associated weighting network which may be employed in the pattern filters is a conventional type as shown in FIG. 5. Thus, a suitable recording drum receives trace input via lead 102 and a recording head 104 while successively delayed outputs are removed at later times by time-displaced reproducing heads 106, 108, 110, 112 and 114. Respective ones of the differently delayed trace outputs from reproducing heads 106–114 are then present on leads 116, 118, 120, 122 and 124 for input to respective weighting networks 126, 128, 130, 132 and 134. The weighting networks 126–134 may be conventional circuitry designed for carrying out such attenuation function, and the outputs from the plurality of weighting networks 126–134 is summed along a single output line 136 for application to the next stage in the present case for application to the summation network 96 of FIG. 4.

Referring again to FIG. 4, each of the second component processing channel 52 and the third component processing channel 58 may be constituted similar to the first component processing channel 46, i.e., a time delay means and weighting networks similar to the structure of FIG. 5 may be employed. The weights of each of the networks of each channel are given in the pseudoinverse matrix $Z^+$. Thus, each of the signal inputs 32, 34, 36 and 38 is applied to the pattern filter 52 with input to respective time delay means 140, 142, 144 and 146 which, in turn, provide respective pluralities of outputs 148, 150, 152 and 154 for input to respective ones of weighting networks 156, 158, 160, and 162. The outputs from weighting networks 156–162 are then summed on output leads 164, 166, 168 and 170 for further summation in a summation network 172 to provide an output $C_2$ on lead 174, output $C_2$ constituting signal data convolved with the second component operator function, indicative only of that preselected signal energy.

The pattern filter 58 is connected in the identical manner with trace input leads 32–38 applied through respective time domain filters 176, 178, 180 and 182 to provide plural individual outputs on respective lead groups 184, 186, 188 and 190 for input to weighting networks 192, 194, 196 and 198. Outputs from weighting networks 192–198 are summed on individual output lines 200, 202, 204, and 206 for further summation in summation network 208 to provide a $C_3$ output containing the third component data on a lead 210.

It should be understood that while each of the lead groups 72–78, 148–154 and 184–190 are shown as including five individual and parallel leads, this is merely a generalization and this number can vary within wide limits depending upon the operator function being utilized. The actual number of parallel leads and associated attenuator for each trace input of each of the pattern filters 46, 52 and 58 will depend upon the specific operator as derived from the operating matrix. thus, the functional diagrams of FIGS. 3A and 3B show the time and amplitude characteristics of the signal inputs and operators as derived from the matrix of FIG. 1.

Figure 1A:
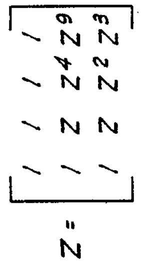
FIG. 1A is an algebraic matrix constructed in accordance with the invention.

FIG. 3A illustrates the input signal functions for each of a plurality of selected signal components in accordance with the matrix function of FIG. 1A. Thus, $S_1(t)$ is derived in column 211 with each of three signal component wavelets being represented with no time delay along the respective time t axes. The summation **211*a*,** $\Delta_1(t) = a(t) + b(t) + c(t)$ may then represent the signal input $S_1(t)$ for application through the operator derivations of FIG. 3B.

Similarly, traces $S_2(t)$, $S_3(t)$ and $S_4(t)$ are derived in like manner by algebraic summation of the respective plural time analog component values in each of columns 213, 215 and 217. In each case, the trace values **213*a*, 215*a* and 217*a*** represent the respective $S_2(t)$, $S_3(t)$ and $S_4(t)$ values for operation application as shown in FIG. 3B. Noting the time axes of the various traces, it can be seen that the Z matrix exponent values represent the time delay for each waveform making up the matrix representation, and each summation or trace input $\Delta_1(t)$ through $\Delta_4(t)$ embodies the respective delay characteristics.

The functional diagram of FIG. 3B illustrates the time versus amplitude relationship of the various input signals, their respective, signal component operators in the $Z^+$ matrix, and the finally derived component operators $C_1$, $C_2$, and $C_3$. Each of the waveforms in FIG. 3B is represented as a time analog waveform of predetermined signal content, and such waveforms as the pattern operators within pattern filter stages 212, 214, and 216 may be directly identified in the $Z^+$ matrix of FIG. 1B as described hereinafter.

Thus, the respective input signals $S_1(t)$ through $S_4(t)$, identified as input signal traces 218, 220, 222 and 224, are indicated as being of equal time length, i.e., from zero to twelve time intervals, such intervals being indicated by the plurality of interval markers 226. The exact length of the time intervals is immaterial as the resulting operators will still be a relatively equated function of the input signal.

Pattern filter group 212 illustrates, and again on similar time scale, the respective operators selective of first signal component characteristics as described by traces 228, 230, 232, and 234; and it may be noted that they are of different waveform. A comparison of the respective matrix quantities **18*a*, 20*a*, 22*a*, and 24*a* of FIG. 1B will indicate the transposition similarities. It may be noted that operator waveform 228 is merely a graphic representation of matrix quantity 18*a* with consideration given to polarity, amplitude multiplier, and with the exponent being directly related to the time interval of the signal sample. Thus, there being no indications for exponents zero through four of matrix quantity 18*a*, the first quantity is $-IZ^5$ which is shown at the fifty time interval marker 236 (FIG. 3) by a unitary negative excursion. The similar graphic representations are made for each of the remaining exponents or time interval values through $Z^{22}$ at interval marker 238. It should be noted too that exponents omitted from matrix quantity 18*p*, e.g., $Z^9$ and $Z^{10}$ values, are merely zero indications and are noted as such by the respective ninth and tenth time interval markers 240 and 242. Similarly, the respective operator waveforms 230, 232, and 234 are directly identifiable as matrix values 20***a*, 22*a*, and 24*a*.

In the same manner, operator waveforms selective of second component energy characteristics are described by the operator waveforms 224, 246, 248 and 250 in the pattern operator group 214. The operator waveforms 244 through 250 may be equated to the matrix values $18_b$, $20_b$, $22_b$ and $24_b$ of column 14 in FIG. 1B. The second component energy operators 244–250 appear to extend over a shorter time span than do the first component operators in pattern group 212, and this is simply due to the nature of the pattern of the selected signals chosen to illustrate this example. As can be noted from pattern group 216, the operators selective of the third component all persist for a relatively longer time duration. Each of third component energy operators, waveforms 252, 254, 256 and 258, are traceable and identifiable as the matrix quantities $18_c$, $20_c$, $22_c$, and $24_c$ of column 16 of the matrix of FIG. 1B. The third component operator values are appreciably longer tending to extend upwards to the 20th exponent while retaining meaningful signal identifying changes. This also is due to the particular third component pattern characteristics selected in this example.

FIG. 3B illustrates the further summation of operators as derived from the summation networks 96, 172 and 208 (FIG. 4) to provide the respective composite first, second and third component operators $C_1$, $C_2$ and $C_3$. These operators 260, 262 and 264 may also vary in time duration; however, this will be a function of the individual contributors within the respective pattern filter groups 212, 214 and 216 are derived from the original signal inputs.

Trace or signal representations having undergone operation in accordance with the functions as represented by waveforms 260, 262, and 264 then require further processing. At this point, the input traces $S_1(t) - S_4(t)$ have experienced convolution with properly determined operators, and the subsequent summation of the time domain filter outputs produces for each channel a signal which contains no energy fitting the other wave patterns. This waveform represents the primary component convolved with the denominator of operator 10, and similarly for the other component waveforms. It is then necessary to recompress the trace information and this can be done by determining a spiking operator with delay corresponding to denominator 10 of the matrix of FIG. 1B. This spiking operator is convolved with each of the summation operator functions $C_1$, $C_2$ and $C_3$ to obtain the component of the input signals which adheres to the particular pattern.

Figure 6:
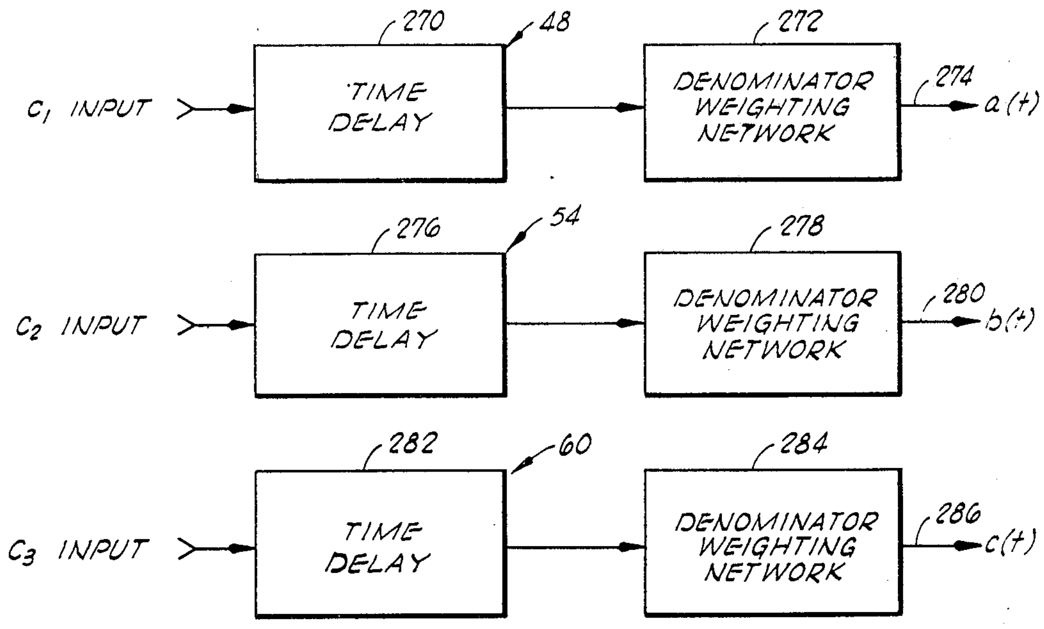
FIG. 6 is a block diagram of additional signal processing circuitry constructed in accordance with the invention.

Such spiking operator convolution is carried out by means of the spiking filters 48, 54 and 60 (FIG. 2), and as shown in greater detail in FIG. 6. The three spiking filters 48, 54 and 60 are identical and consist of a time domain filter operating through a suitable weighting network. Thus, spiking filter 48 receives the $C_1$ component operator input for application to a time domain filter 270 which output is weighted in a denominator weighting network 272 to provide a signal output 274 representative of first component signal characteristics $a(t)$. The second component information or $C_2$ input is applied through a time domain filter 276 and then to a denominator weighting network 278 and second component $b(t)$ information output 280. Similarly, $C_3$ input is applied through a time domain filter 282 and series-connected denominator weighting network 284 to provide a third component $c(t)$ information output 286. Each of the spiking filters 48, 54 and 60, which comprise a time domain filter and denominator weighting network, may be conventional equipment as illustrated in FIG. 5.

Similar operator values are adjusted into each of the weighting networks 272, 278 and 284. Such operator may be termed the spiking operator D′ which is an approximation of the reciprocal of the denominator of $Z^+$ or denominator 10 of the matrix of FIG. 1. Thus, if the denominator D is considered as a sequence as $d_o, d_1, d_2, \ldots, d_n$, a rectangular matrix $\Delta$ $(n + m - 1, m)$ can be constructed from the operator D′. That is, in accordance with conventional spiking filter design, and much in the same manner as was followed in constructing the previous matrix Z+, the matrix identity $\Delta\Delta+$ can be used such that a spiking operator can be extracted from $\Delta^+$. In the determination of $\Delta^+$, loading of the diagonal of (D′D) can be used to obtain more stable operators, Thus, the center row of the pseudoinverse $\Delta^+$ will give another sequence $d'_0, d'_1, d'_2, \ldots, d'_m$, representative of the spiking operator function which, upon filtering with one of the signals resulting from the first convolutions, will produce proper energy components along each of the selected energy patterns. Referring to FIG. 6, each of the time domain filters 270, 276 and 282 and respective denominator weighting networks 272, 278 and 284 are similarly adjusted in accordance with the recursive filtering characteristics as determined from a selected center row of matrix $\Delta^+$. That is, the respective time delay outputs from each of time domain filters 270, 276 and 282 will be analogous in number and delay and, subsequently, the delayed outputs are applied to respective equally weighted attenuation networks within each of the denominator weighting networks 272, 278 and 284.

Operation

The method and apparatus of the present invention may be employed to process multiple signal input information to extract energy components representative of specific forms of signal. As previously discussed by way of example, these may be first component energy, second component energy, third component energy, etc. Prior to setting up the equipment or apparatus of the invention, some information of the input signal or source should be available to allow pre-setting of the apparatus. A sample of the input signal information may be examined to isolate a selected pattern of energy which will enable determination of relative t (time shift) values. Such t time shift values are the known quantities which provide a numerical base upon which the entire unscrambling process can function to isolate and extract the different forms of signal component information.

Figure 4:
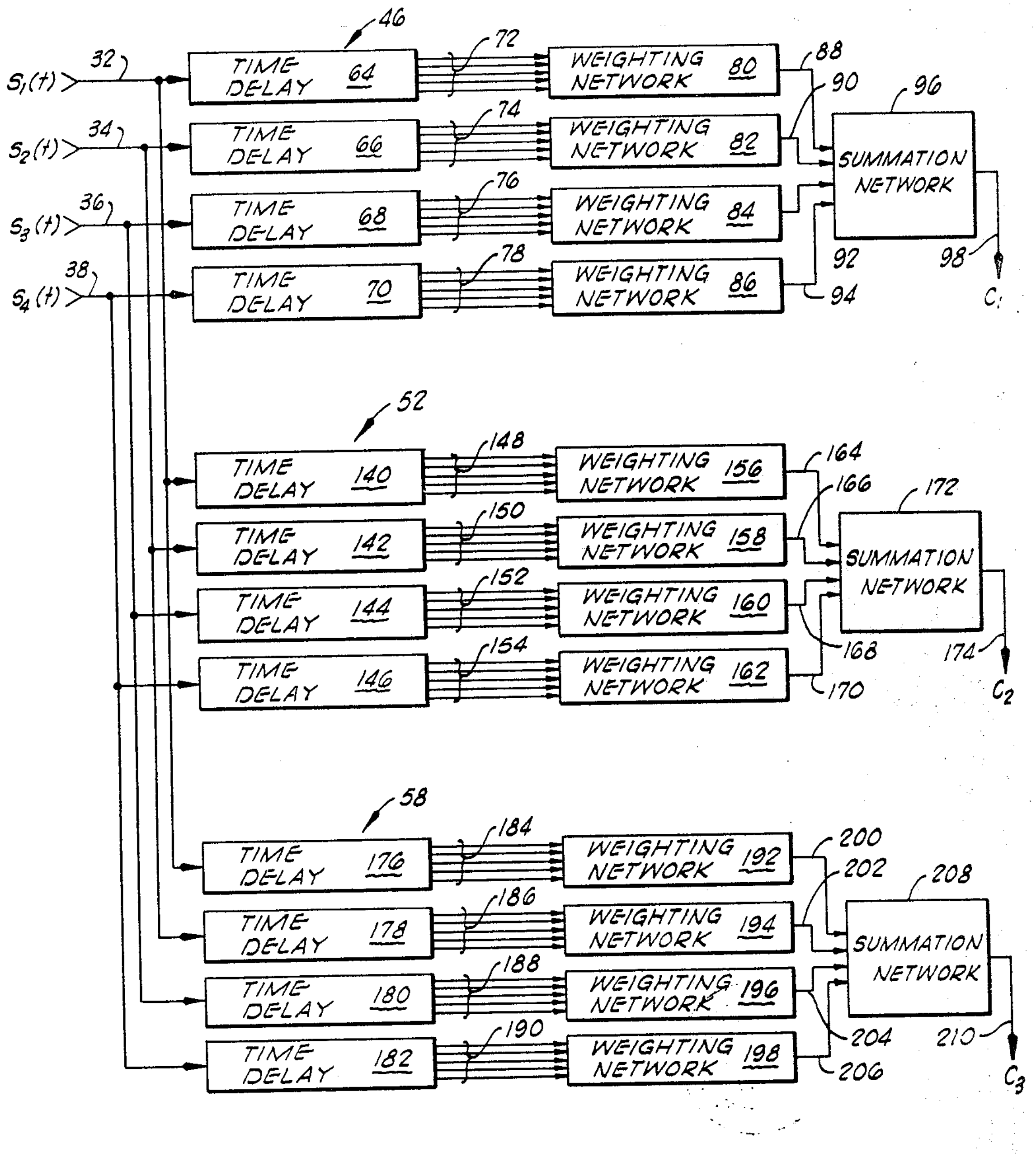
FIG. 4 is a block diagram of analog apparatus for carrying out signal processing in accordance with the invention.

The apparatus of FIGS. 4 and 6, adjusted in accordance with operator values such as shown in FIG. 3B, operate to extract specific forms of signal information. The graphic waveform representations of FIG. 3B are merely a time analog representation of the operating matrices from FIG. 1B which may be applicable to a particular set of input signal traces. Thus, for a given set of input signal traces as $S_1(t) - S_4(t)$ (FIG. 3A), and for known $t$ or time shift values as derived from inspection of pertinent signal data, a matrix can be constructed such as that shown in FIG. 1B. Having determined the set of delays $t_{ij}$ (Equation 2) the method then proceeds with building the matrices related to the T values such that each element of the matrix is a symbolic variable Z elevated to the power $t_{ij}$ in the present case selection of $$t_{ij}=\begin{bmatrix} 0 & 0 & 0 & 0 \\ 0 & 1 & 4 & 9 \\ 0 & 1 & 2 & 3 \end{bmatrix} \tag{12}$$

as determined from consideration of equations (1) and (2) resulted in the conclusion that $$Z=\begin{bmatrix} 1 & 1 & 1_4 & 1_9 \\ 1 & z & z_2 & z_3 \\ 1 & z & z & z \end{bmatrix} \tag{13}$$

such that the pseudoinverse of Z is equation (10), such pseudoinverse value $Z^+$ being fully expanded in the matrix of FIG. 1.

The matrix values represented in FIG. 1 can then be set into the various time domain filters within respective pattern filters 40, 42 and 44 of FIG. 4. The matrix of FIG. 1 can be broken down such that column 12 represents first component information, column 14 represents second component information, and column 16 represents third component information, and the various matrix values can be adjusted into the respective time domain filters of pattern filters 46, 52 and 58. The matrix values 18-, 20_p_, 22_p_ and 24_p_ provide time delay adjustment to respective time domain filters 64, 66 and 68 and 70. That is, the Z variable of the shifting operator corresponds to shifting the signal by _n_ time sampling intervals such that the exponents of the Z value may be directly analogized to a time interval in the operator sequence.

The polarity and amplitude of each respective Z value are further adjusted into the weighting networks 80, 82 and 84 and 86 in known manner. The selected Z value for matrix columns 14 and 16 are adjusted into the respective pattern filters 52 and 58 in like manner.

Input signals then applied at the $S_1(t) - S_4(t)$ inputs 32, 34, 36 and 38 will then be operated on in adherence to the matrix functions with final summation of extracted component information in the respective summation networks 96, 172 and 208 to provide output signals on leads 98, 174 and 210. The respective component outputs $C_1$, $C_2$ and $C_3$ are then ready for further processing.

Each of the component information signals $C_1$, $C_2$ and $C_3$ contains the desired extracted signal information, but it is convolved with the operator function corresponding to the denominator. Instead of using the spiking filter described earlier, it is also possible to further subject the signals to recursive filtering to isolate the desired information; this can be brought about by subjecting each of the $C_1 - C_3$ component output signals to a recursive filter operation which adheres to the time-amplitude qualities of the denominator 10 of the matrix of FIG. 1. This will be shown later in conjunction with FIG. 7.

When using the spiking filter, the denominator pseudo-inverse $\Delta^+$ is determined in well-known manner for employ in adjusting the various consecutive time delays and series-connected weighting networks as contained in each of the spiking filters 48, 54 and 60 of FIG. 6. Each of the $C_1$, $C_2$ and $C_3$ inputs receives the similar operator convolution, and the desired extracted information is presented at the output of denominator weighting networks 272, 278 and 284; that is, a summation of weighted output signals are present on each of output leads 274, 280 and 286 and they represent the extracted first, second and third component information traces, respectively.

It should be understood that while an analog apparatus is fully described and set forth herein, the performance of the method may also be carried out by digital computer apparatus which is specifically programmed for the electrical signal information extraction operation. Such digital computation can be generally relied upon to require input of two distinctly different program outlines. Thus, a first program operates to construct the desirable filters, i.e., the various time domain filters which adhere to the requirements as determined by the optimum controlling matrix, and a second program is employed in coordinating the constructed filter in its operation on the input signal data.

While the method and apparatus has been more particularly described relative to input of four electrical signals, it should be understood that any number of signal traces may be employed, various peripheral considerations dictating the number and application of input trace information. Further, while specific references have been made to frequency variant and interference energy components for purposes of explanation, any of various time-varying components and combinations of components of energy which can be established may be utilized in the process. The selection of processing methods may vary within a wide range of limits depending upon the exigencies of each particular application.

Figure 7:
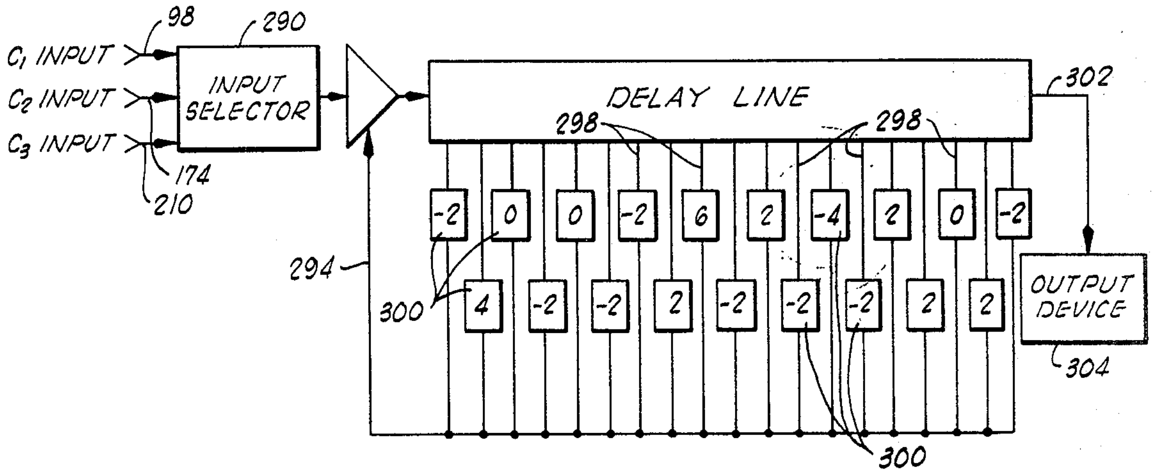
FIG. 7 is a block diagram of alternative signal processing circuitry which may be employed in place of the processing circuitry of FIG. 6.

An alternative procedure consists of utilizing the apparatus of FIG. 7 in series with that of FIG. 4 to substitute a different recursive filtering of the $C_1$, $C_2$ and $C_3$ outputs on leads 98, 174 and 210. Thus, the respective output leads 98, 174 and 210 (FIG. 4) are applied to an input selector 290 which selects one of the $C_1$, $C_2$ and $C_3$ inputs for application to an operational amplifier 292 which receives controlling feedback input via a lead 294. The output of operational amplifier 292 is applied to a delay line 296 which provides a plurality of outputs 298, each delayed by successively greater amounts with input to a selected one of the adjustable, phase-sensitive attenuators 300. Output from each of the adjustable attenuators 300 is applied via lead 294 for feedback through the operational amplifier 292 while final output from delay line 296 is applied via lead 302 to a suitable output device 304, e.g, recorder, camera, oscillograph, etc.

The delay line 296 and the plurality of attenuators 300 combine to produce reverse recursive filtering such that an output at 302 will contain the component of the original input (e.g., $C_1$, $C_2$ or $C_3$) which fits the applicable operator pattern. It may be noted, in this case, that the delay line 296 and attenuators 300 are set in accordance with the denominator of $Z^+$ or the matrix denominator 10 (FIG. 1) without requiring any further determinations. Thus, proceeding left-to-right across the successive delay outputs 298 of delay line 296, each of the attenuators 300 can be likened to the proper amplitude ratio of the $Z^+$ denominator, polarities being reversed due to the reciprocal nature of the quantity.

There are various other analog devices which may be employed in carrying out the method of the invention. Thus, while specific reference is made to the time domain filtering concept and well-known forms of tape delay means and associated weighting networks, there are any number of various record delay units, acoustic delays, cathode ray filters and such related devices which may be coupled with suitable forms of weighting amplifiers or attenuators to perform the requisite functions of convolving an input signal with a predetermined time-changing operator value. It should be understood too that the processing method of the present invention may be combined with other known types of signal enhancement technique to perform additional functions upon extracted information; for example, such additional processing providing the possibility of extremely accurate and detailed analysis of seismic signal return energy.

The foregoing discloses a novel method and apparatus which may be used for treating electrical signal energy in a manner whereby specific time/analog information is extracted without loss or degradation of the product signal energy. The method is applicable for use with many types of electrical signal energy and can be performed by analog, digital, or certain combinations of analog-digital equipment. The present method has the advantage of providing an information extraction approach to signal processing as further coupled with the capability of processing reasonably large time increments of input signal data.

Changes may be made in the combination and arrangement of steps as heretofore set forth in the specification and shown in the drawings, it being understood that changes may be made in the suggested structure disclosed without departing from the spirit and scope of the invention.

What is claimed is:

1. Apparatus for processing multi-signal input electrical information by effecting exclusive extraction of plural data indications each having predetermined energy characteristics, comprising:

means for dividing said multi-signal electrical information into plural, parallel groups of plural signal inputs;

a plurality of convolution means each receiving a group of said plural signal inputs for separately convolving each input with a signal component operator representative of time and amplitude characteristics for a selected energy component of said plural signal inputs such that a respective convolution output is generated for each of said particular energy components;

a plurality of summation means for separately summing the plural convolution outputs from each of said plural convolution means to generate a plurality of generalized indications of component signal energy which is present in said signal inputs.

2. A multi-signal pattern discriminating filter for processing one or more input signal traces of related electrical data, comprising:

input means receiving said input traces of signal data;

a plurality of pattern filter means each receiving said input traces of signal data and each providing a time analog signal output which is representative of a respective one of plural selected components of energy, each pattern filter means including plural time domain filter means each receiving a different one of said plural signal traces as input and each providing a plurality of time delayed outputs which are delayed by a different time, and each including plural weighting networks each functioning in accordance with a characteristic operator determined by the pseudoinverse matrix function for the input signal and each receiving one of said pluralities of time delayed outputs from a respective time domain filter means to provide a summed output, each such filter also including summation means receiving the summed output from each of said plural weighting networks to provide a further summed time analog signal indicative of a selected signal energy component; and output means selectively providing a record and indication of each of the plurality of further summed time analog signal energy component outputs.

3. A multi-signal pattern discriminating filter as set forth in claim 2 which is further characterized in that:

each time domain filter of said plurality of pattern filter means delays each respective one of the plurality of time delayed outputs by the same increment.

4. Apparatus for processing multi-signal input electrical information as derived for plural related seismic trace data by effecting exclusive extraction of plural data indications each having predetermined energy characteristics, comprising:

means for driving said multi-signal electrical seismic trace information into plural, parallel groups of plural trace inputs;

a plurality of convolution means each receiving a group of said plural trace inputs for separately convolving each input with a signal trace operator representative of time and amplitude characteristics for energy traveling along one of a plurality of paths corresponding to particular components of seismic energy such that a respective convolution output is generated for each of said particular components;

a plurality of summation means for separately summing the plural convolution outputs from each of said plural convolution means to generate a plurality of generalized indications of seismic energy which has traveled along each of said plural particular paths.

* * * * *

PO-1050
(5/69)

UNITED STATES PATENT OFFICE
CERTIFICATE OF CORRECTION

Patent No. 3,774,146 Dated November 20, 1973

Inventor(s) Pierre L. Goupillaud

It is certified that error appears in the above-identified patent and that said Letters Patent are hereby corrected as shown below:

Column 12, line 1, after "trical" insert --signal--

Column 12, line 36, delete "driving" and substitute --dividing--

Signed and sealed this 17th day of September 1974.

(SEAL)
Attest:

McCOY M. GIBSON JR.
Attesting Officer

C. MARSHALL DANN
Commissioner of Patents